United States Patent [19]
Fontenot

[11] Patent Number: 6,052,726
[45] Date of Patent: Apr. 18, 2000

[54] DELAY CALCULATION FOR A FRAME RELAY NETWORK

[75] Inventor: Michael D. Fontenot, Plano, Tex.

[73] Assignee: MCI Communications Corp., Washington, D.C.

[21] Appl. No.: 08/885,161

[22] Filed: Jun. 30, 1997

[51] Int. Cl.[7] .............................. G06F 13/38; G06F 15/17
[52] U.S. Cl. ............................ 709/224; 370/252; 702/79
[58] Field of Search ....................... 370/252; 395/200.54; 702/79, 89, 178; 709/224

[56] References Cited

U.S. PATENT DOCUMENTS

| | | | |
|---|---|---|---|
| 4,894,823 | 1/1990 | Adelmann et al. | 370/60 |
| 5,313,454 | 5/1994 | Bustini et al. | 370/13 |
| 5,450,394 | 9/1995 | Gruber et al. | 370/17 |
| 5,515,403 | 5/1996 | Sloan et al. | 375/371 |
| 5,740,159 | 4/1998 | Ahmad et al. | 370/249 |
| 5,764,626 | 6/1998 | VanDervort | 370/232 |
| 5,793,976 | 8/1998 | Chen et al. | 395/200.54 |
| 5,812,528 | 9/1998 | VanDervort | 370/235 |

*Primary Examiner*—Mark H. Rinehart

[57] ABSTRACT

Delays are calculated for one or more virtual connections within a frame relay network. The delays may be calculated at periodic intervals for each virtual connection within the frame relay network so as to provide updated information about delays among the virtual connections. Each delay is calculated by sending a special delay measurement frame from an originating switch to a destination switch. The destination switch receives the frame and returns the frame to the originating switch. The time difference between when the frame was sent from the originating switch to when the frame is received back at the originating switch is calculated and designated as the delay value. A timestamp may be affixed to the frame to specify the time at which the frame is initially sent from the originating switch.

10 Claims, 5 Drawing Sheets

DELAY CALCULATION FOR A FRAME RELAY NETWORK

TECHNICAL FIELD

The present invention relates generally to telecommunications systems and more particularly to delay calculation for a frame relay network.

BACKGROUND OF THE INVENTION

The increased need for a speed across network platforms has increased the popularity of frame relay networks. Frame relay networks provide high-speed packet switching and are generally used to connect multiple local area networks (LANs). Frame relay networks exploit the notion of virtual connections. These virtual connections provide point-to-point connections between sites. The bandwidth of each of the virtual connections may be shared among multiple applications. Delay determination is difficult in conventional frame relay networks for a couple of reasons. First, many conventional frame relay networks use connection-less infrastructures that can overcome equipment or path failures within the network. Virtual connections that are provisioned across such connection-less infrastructures may take different paths at different points in time, and, as a result, each path may have different delay characteristics.

Second, the delay may vary in accordance with resource utilization and, thus, is not constant. Frame relay networks transmit frames that may encounter queuing or buffering as they traverse the network. The degree of buffering is usually a function of resource utilization within a network. In general, as resource utilization increases, additional traffic may need to be buffered until the resources are available. This also results in a dynamic variation in delay for the virtual connections in a frame relay network.

This inability to easily determine delay in frame relay networks is frustrating to many customers. Many customers have migrated from private line environments to frame relay networks. In private line environments, the delay across connections is usually quite constant. The inability to accurately calculate delays in frame relay networks makes frame relay networks less desirable to many customers.

SUMMARY OF THE INVENTION

The present invention provides a mechanism for determining delay for virtual connections in a frame relay network. The present invention gathers information regarding the delay of one or more virtual connections and then stores this information. Clients may then receive the delay information by requesting it as needed.

In accordance with a first aspect of the present invention, a method is practiced in a frame relay network having switches. A virtual connection is provided that logically connects an originating switch in the frame relay network to a destination switch in the frame relay network. A frame is transmitted from the originating switch to the destination switch. In turn, the frame is then retransmitted from the destination switch back to the originating switch so that the originating switch receives the frame. A time value is determined to be equal to how much time expired between the transmitting of the frame from the originating switch to receiving the frame by the originating switch. This determined time value is designated as a delay measurement value for the virtual connection.

In accordance with a further aspect of the present invention, a method is practiced in a frame relay network that has storage and switches. The switches include a first and second switch that constitutes endpoints of a virtual connection. At periodic intervals, a delay measurement value is calculated for the virtual connection. The delay measurement value is stored in the storage, and access to the delay measurement value is provided to a client.

In accordance with another aspect of the present invention, a frame relay network includes a first switch, a second switch, and a connection that connects the first switch with the second switch. The frame relay network also includes a delay measurement calculator for calculating a delay measurement corresponding to how long it takes for a frame to be sent from the first switch to the second switch and back from the second switch to the first switch.

BRIEF DESCRIPTION OF THE DRAWINGS

A preferred embodiment of the present invention will be described below relative to the following drawings.

DETAILED DESCRIPTION OF THE INVENTION

The preferred embodiment of the present invention provides a mechanism for periodically obtaining delay measurements for a virtual connection in a frame relay network. The delay determinations may be persistently stored and passed on to clients that request such information. A delay determination for a virtual connection is realized by adding a timestamp to a specially designated frame that is sent from an originating switch in the frame relay network to a destination switch in the frame relay network. The two switches constitute endpoints of the virtual connection. The destination switch recognizes the frame as one that is specially designated for calculating a delay measurement and returns the frame to the originating switch. The originating switch calculates the difference between the current time at which it receives the frame from the time of the timestamp to calculate the delay measurement for the virtual connection. This process may be repeated periodically for a virtual connection. Moreover, this process may be performed on a periodic basis for multiple virtual connections within a frame relay network.

The preferred embodiment of the present invention provides a method for making delay measurement determinations for virtual connections in a frame relay network and providing this information to clients. The delay measurements may occur periodically so as to account for dynamic fluctuations in delays in virtual connections. Moreover, the delay determination approach of the preferred embodiment of the present invention is easily performed and requires minimal overhead.

Before discussing the details of the preferred embodiment of the present invention, it is helpful to define a few terms that will be used hereinafter. A "frame relay network" is a network of frame relay frame handlers that pass frame relay frames that correspond with the appropriate set of American National Standards Institute (ANSI) and ITU standards.

A "frame" refers to a data structure that has fields predetermined by a protocol for transmission of data.

A "virtual connection" is a logical connection and refers to the facilities provided by the network that give the appearance of an actual connection. A virtual connection may be referred to as a virtual circuit. A virtual circuit is to be contrast with a physical circuit and may refer to a logical data transmission channel that may be shared by multiple users simultaneously.

Figure 1:
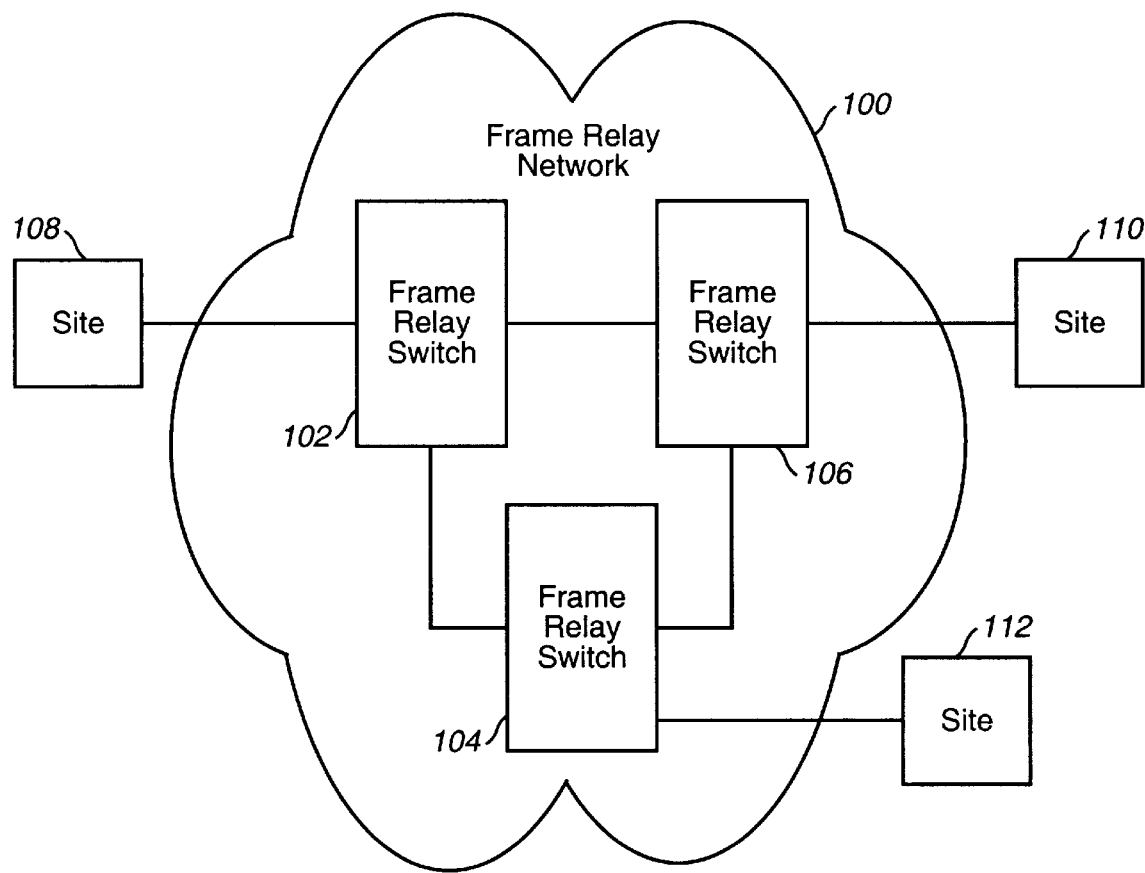
FIG. 1 is a block diagram that illustrates an example frame relay network.

FIG. 1 shows an example of a frame relay network 100. The frame relay network includes frame relay switches 102, 104, and 106. Those skilled in the art will appreciate that the depiction of the frame relay network 100 in FIG. 1 is intended to be merely illustrative and not limiting of the present invention. The frame relay network may include more switches than those depicted in FIG. 1 or alternatively may include fewer switches than those depicted in FIG. 1. In addition, the switches may be interconnected differently. Sites 108, 110, and 112 are connected to the frame relay network 100 via respective switches 102, 106, and 104. The interconnection of the sites to one of the switches provides access to all of the switches within the frame relay network 100. The frame relay switches 102, 104, and 106 may include processors and internal storage for facilitating switching functionality. In a preferred embodiment of the present invention, the switches run code that facilitates the delay measurement which will be described in more detail below. Those skilled in the art will appreciate that a number of different types of commercially available switches may be used as the frame relay switches 102, 104, and 106.

Virtual connections are defined to connect the sites 108, 110, and 112. The sites may constitute computer systems, such as server systems, personal computers or other types of sites.

Figure 2:
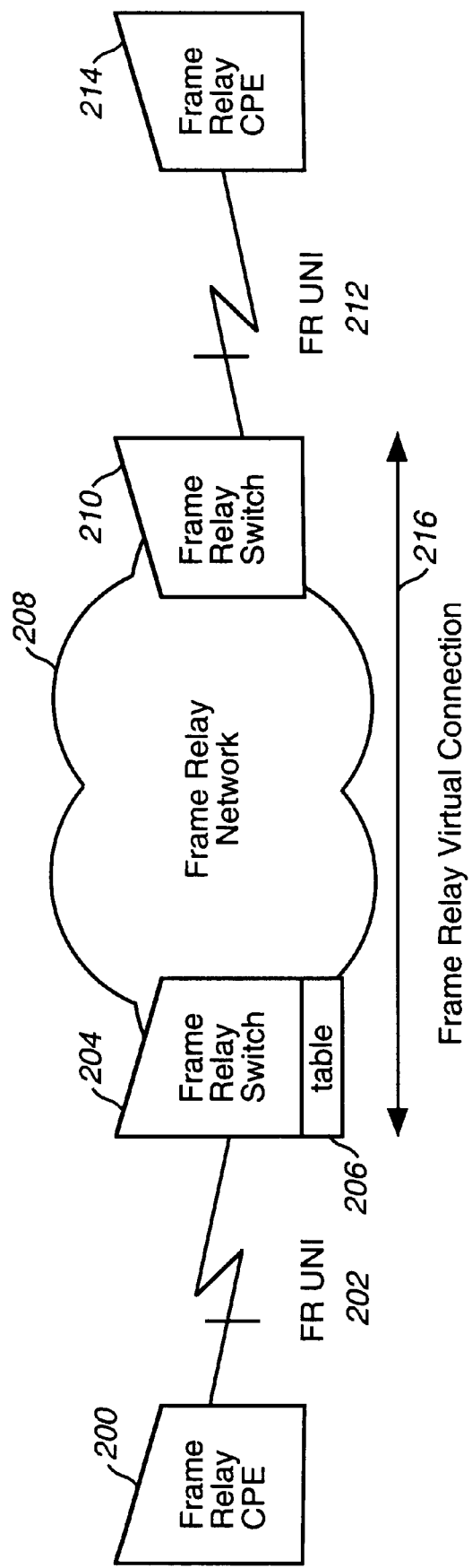
FIG. 2 is a diagram that illustrates an example of components that are utilized to make a delay determination for a frame relay network in the preferred embodiment of the present invention.

FIG. 2 depicts an example of components within a frame relay network environment that play a role in the preferred embodiment of the present invention. This environment includes customer premises equipment (CPE) 200 and 214 that are interfaced to a frame relay network 208. Frame relay user-to-network interfaces (FR UNI) 202 and 212 interface the CPEs 200, 214 with the frame relay network 208. The frame relay network 208 includes a frame relay switch 204 that interfaces with frame relay CPE 200 and a frame relay switch 210 that interfaces with frame relay CPE 214. The connection between FR UNI 202 and FR UNI 212 constitutes a frame relay virtual connection 216.

Figure 3:
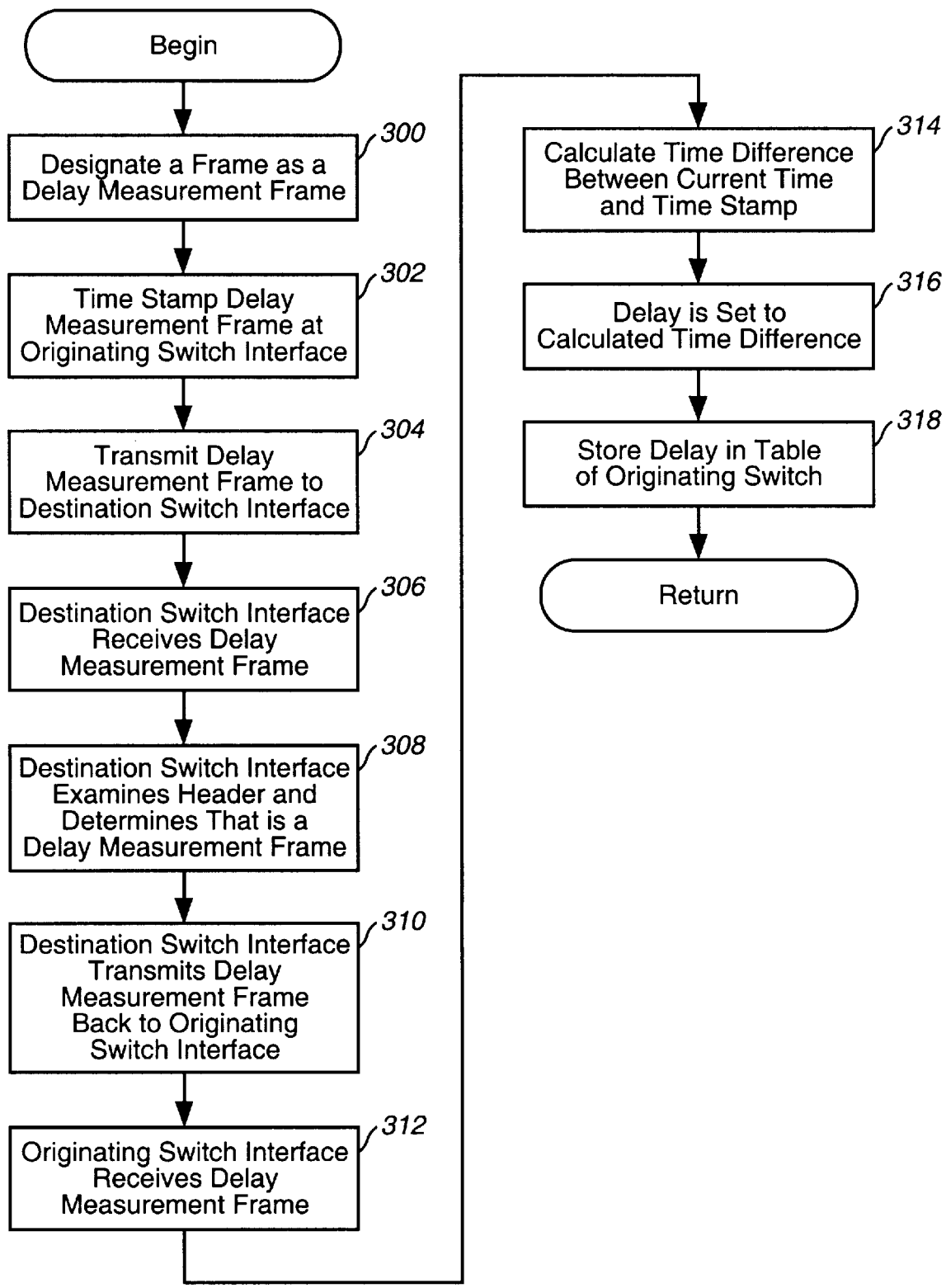
FIG. 3 is a flow chart illustrating the steps that are performed to make a delay determination in accordance with a preferred embodiment of the present invention.

As was discussed above, the preferred embodiment of the present invention determines the delay for a given virtual connection by passing a packet across the virtual connection and determining the time it takes to complete a round-trip. FIG. 3 is a flow chart that illustrates the steps that are performed in making such a delay determination. The steps shown in FIG. 3 are those that are performed for a given virtual connection to calculate the delay measurement a single time. As will be described in more detail below, the preferred embodiment of the present invention may calculate delay measurements for multiple virtual connections and may periodically calculate the delay measurements for each virtual connection so as to have updated delay measurements that are useful to clients.

Initially, for purposes of illustration, the steps depicted in FIG. 3 will be described in conjunction with FIG. 2. Initially, an originating frame relay switch 204 desires to determine the delay along a virtual connection between FR UNI 202 and FR UNI 212 that leads to a destination switch 210. The originating frame relay switch 204 creates a designated frame as a delay measurement frame. In particular, information is incorporated into a super frame that indicates that the frame is a delay measurement frame. Most frame relay switch manufacturers encapsulate frame relay frames in a super frame before transferring the frame across the network. The super frame contains the frame relay frame plus additional information that helps transfer the frame relay frame across the network.

Figure 4A:
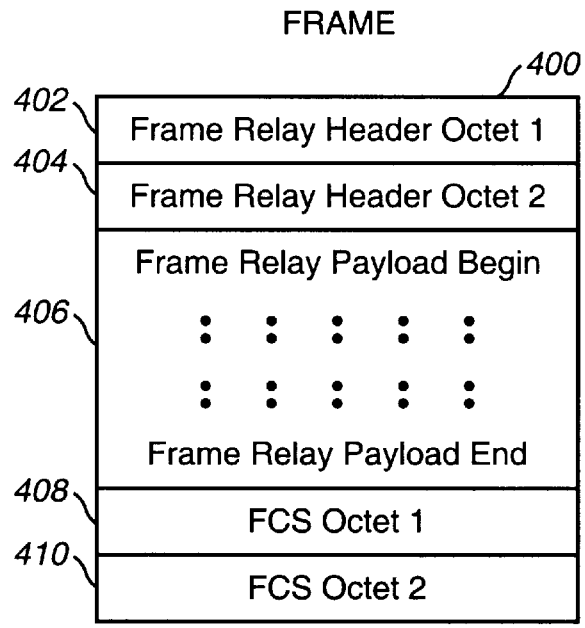
FIG. 4A illustrates the format of a frame for a frame relay network.

An example is helpful to illustrate the difference between a frame relay frame and a super frame. FIG. 4A shows a frame relay frame ("frame") 400 that is suitable for use in the preferred embodiment of the present invention. The frame 400 includes a first octet 402 and a second octet 404 of header information. The header information includes address and control information to help the frame 400 to be transmitted across the network 100. The frame 400 also includes a payload for holding data that is to be transmitted. The frame 400 additionally includes two octets 408 and 410 of frame check sequence (FCS) information. These octets 408 and 410 hold information that is used in error correction.

Figure 4B:
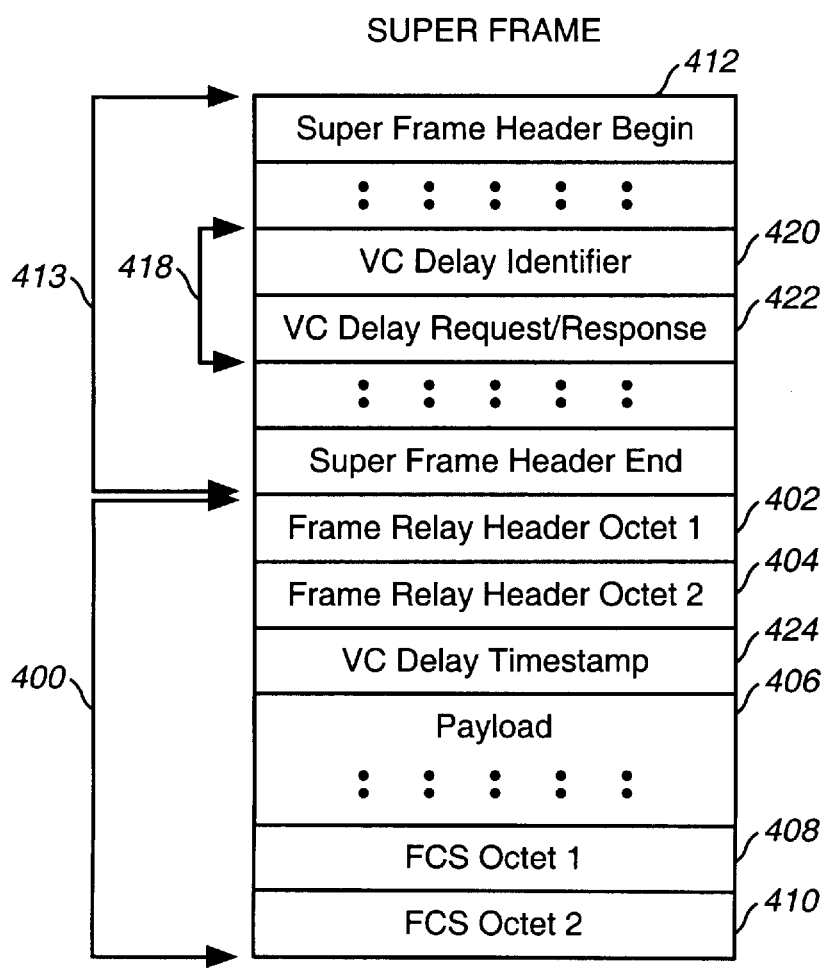
FIG. 4B illustrates the format of a super frame in accordance with a preferred embodiment of the present invention.

FIG. 4B shows a super frame 412 that is suitable for practicing the preferred embodiment of the present invention. The super frame 412 encapsulates the frame 400 and the contained fields 402, 404, 406, 408, and 410. The super frame 412 also includes a super frame header 413. When the frame 400 is a delay measurement frame, a virtual circuit delay identifier 420 is stored within the super frame header 413. Field 422 within the super frame header 413 indicates whether the frame is a request or response. The originating switch 204 sends the delay measurement frame as a request, and "request" is designated in field 422. As will be described in more detail below, the destination switch 210 receives the request frame, and modifies the information 422 to indicate that a response delay measurement frame is being returned to the originating switch as a "response." Thus, new information 418, which includes fields 420 and 422, are added to the super frame header 413 to facilitate delay measurement in the preferred embodiment of the present invention.

In step 300 of FIG. 3, field 420 is provided with information indicating that the frame is a delay measurement frame, and field 422 is set to initially submit the delay measurement frame as a request. A timestamp 424 indicating the current time is added to the frame 400 at the originating switch interface (step 302 in FIG. 3). The timestamp may be generated from a number of different sources including an internal clock within the originating switch. The delay measurement frame is then transmitted over the frame relay network 208 to the destination frame relay switch 210 (step 304 in FIG. 3), and the destination switch interface receives the delay measurement frame (step 306 in FIG. 3).

The destination switch interface examines the super frame header 413 and determines that the encapsulated frame 400 is a delay measurement frame based upon the virtual circuit delay identifier 420 (step 308 in FIG. 3). The destination switch modifies field 422 to indicate that the delay measurement frame is now being sent as a response. The destination switch 210 immediately transmits the delay measurement frame back to the originating switch 204 (step 310 in FIG. 3).

The originating switch interface receives the delay measurement frame (step 312 in FIG. 3). The originating switch interface notes the current time at which the delay measurement frame was received. The time difference between the current time and the timestamp 424 contained within the frame 400 is calculated (step 314 in FIG. 3). The delay measurement is then set to this calculated time difference (step 316 in FIG. 3). The time difference represents the time it took for the delay measurement frame to be sent from the originating switch 204 to the destination switch 210 and back again. As these switches 204 and 210 constitute the ends of a virtual circuit or virtual connection, the calculated delay constitutes the delay measurement for the virtual connection. This delay is stored in a table 206 that is stored at the originating frame relay switch 204 (step 318 in FIG. 3). The storage of the delay measurement in the table ensures that this information is available to clients who may request it. Those skilled in the art will appreciate that the delay measurement need not be stored in such a data structure but rather may be immediately transmitted to a requesting client. Alternatively, the delay measurement may be stored in different types of data structures that yield more efficient storage or quicker access, depending upon the needs of the environment in which the switches are positioned.

Figure 5:
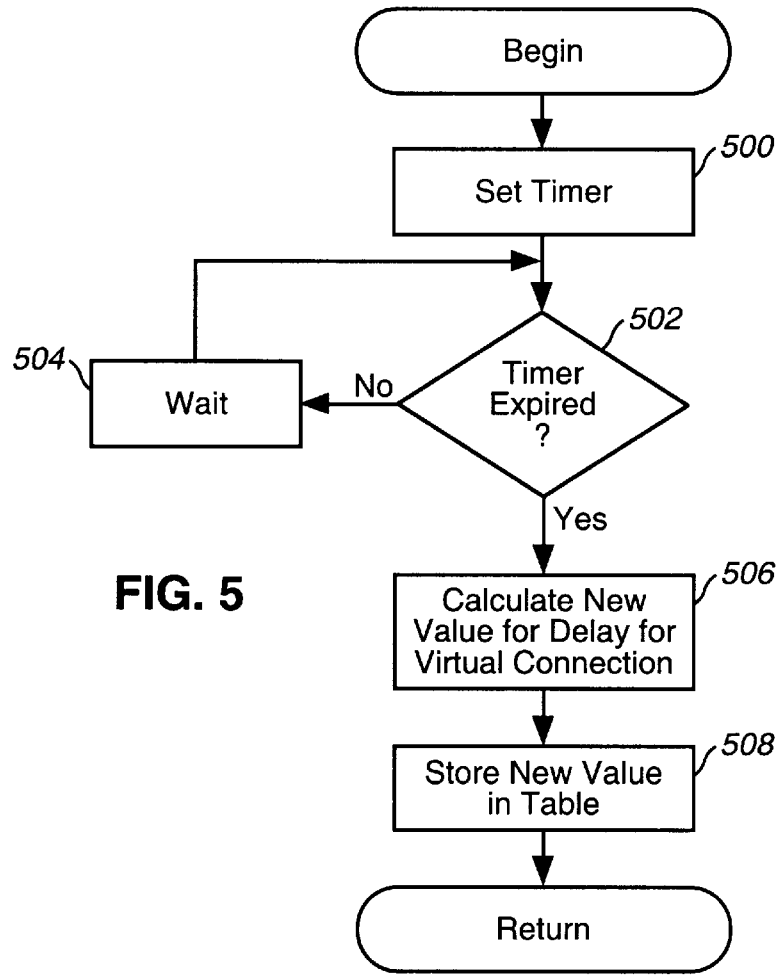
FIG. 5 is a flow chart illustrating the steps that are performed to periodically obtain new delay determination values for a virtual connection.

As was mentioned above, FIG. 3 represents a single instance of calculating a delay measurement for a virtual connection. The preferred embodiment of the present invention periodically calculates such delay measurements for one or more virtual connections. FIG. 5 shows an example of the steps that are performed to periodically perform such determinations. Initially, a timer is set for a time period constituting the desired periodic interval (step 500 in FIG. 5). A check is made whether the timer has expired (step 502 in FIG. 5). If the timer is not expired, a wait is experienced (step 504 in FIG. 5). When the timer expires, a new value for the delay for a virtual circuit is determined (step 506 in FIG. 5). This new value may be calculated by performing the steps depicted within FIG. 3. The new value is then stored in a table 206 to replace the old value (step 508 in FIG. 5). Those skilled in the art will appreciate that the new value need not supplant the old value; rather, in alternative embodiments, a history of values may be stored within the table 206.

Figure 6:
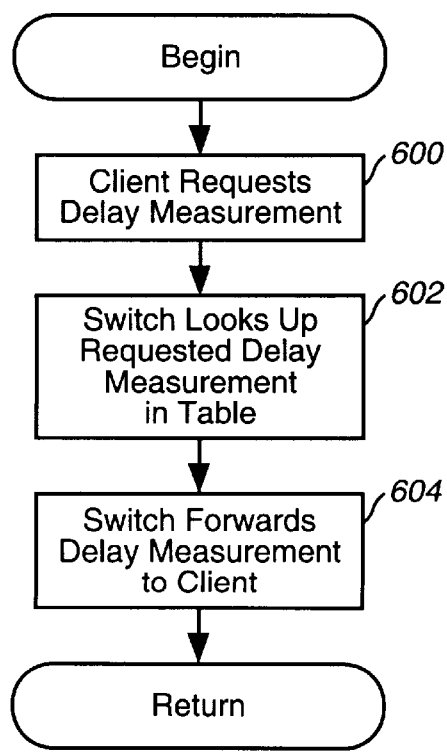
FIG. 6 is a flow chart illustrating the steps that are performed for a client to obtain a delay determination value for a virtual connection.

As was mentioned above, the delay measurements may be forwarded to requesting clients. FIG. 6 is a flow chart illustrating the steps that are performed to service the request of such clients. Initially, a client, such as an application program, requests a delay measurement for a given virtual connection (step 600 in FIG. 6). The frame relay switch to which the request is sent then looks up the requested delay measurement in the table 206 (step 602 in FIG. 6). The switch then forwards the delay measurement that has been obtained from the table to the requesting client (step 604 in FIG. 6).

While the present invention has been described with reference to a preferred embodiment thereof, those skilled in the art will appreciate that various changes in form and detail may be made without departing from the intended scope of the present invention as defined in the appended claims.

I claim:

1. In a frame relay network having switches, a method comprising the steps of:

provided a virtual connection that logically connects an originating switch in the frame relay network to a destination switch in the frame relay network;

transmitting a frame from the originating switch to the destination switch;

transmitting the frame from the destination switch to the originating switch so that the originating switch receives the frame;

determining a time value equal to how much time expired between the transmitting of the frame from the originating switch to receipt of the frame by the originating switch; and designating the determined time value as a delay measurement for the virtual connection.

2. The method of claim 1, further comprising the step of attaching a timestamp to the frame at the originating switch to specify a time at which the frame is transmitted from the originating switch towards the destination switch.

3. The method of claim 2 wherein the time value is determined by subtracting a time at which the originating switch receives the frame from the time specified by the timestamp.

4. The method of claim 1, further comprising the step of adding information with the frame at the originating switch before the transmitting to the destination switch to indicate that the frame is being used for delay measurement.

5. The method of claim 1 wherein the frame is encapsulated in a super frame and wherein the super frame includes a header that holds information regarding the frame.

6. The method of claim 5 wherein the super frame includes a field that specifies that the frame is being used for delay measurement.

7. The method of claim 5 wherein the super frame includes a field that indicates whether the frame is being transmitted as a request for calculating a delay measurement or in response to a request for delay measurement.

8. The method of claim 7 wherein the originating switch marks the field in the super frame to indicate that the frame is being transmitted as a request for calculating a delay measurement and wherein the destination switch marks the field in the super frame to indicate that the frame is being transmitted in response to a request for delay measurement.

9. The method of claim 1, further comprising the steps of repeating the steps of the method to calculate an updated delay measurement for the virtual connection.

10. The method of claim 1, further comprising the steps of receiving a request for the delay measurement from a client and providing the delay measurement to the client in response to the request.

\* \* \* \* \*